(12) United States Patent
Katayama et al.

(10) Patent No.: US 9,745,396 B2
(45) Date of Patent: Aug. 29, 2017

(54) METHODS FOR PRODUCING α-OLEFIN POLYMER AND HYDROGENATED α-OLEFIN POLYMER

(71) Applicant: IDEMITSU KOSAN CO., LTD., Chiyoda-ku (JP)

(72) Inventors: Kiyokazu Katayama, Ichihara (JP); Hideaki Noda, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/776,025

(22) PCT Filed: Mar. 12, 2014

(86) PCT No.: PCT/JP2014/056579
§ 371 (c)(1),
(2) Date: Sep. 14, 2015

(87) PCT Pub. No.: WO2014/142206
PCT Pub. Date: Sep. 18, 2014

(65) Prior Publication Data
US 2016/0032033 A1    Feb. 4, 2016

(30) Foreign Application Priority Data
Mar. 14, 2013 (JP) ................. 2013-052154

(51) Int. Cl.
| | |
|---|---|
| *C08F 210/14* | (2006.01) |
| *C08F 4/6592* | (2006.01) |
| *C08F 8/04* | (2006.01) |
| *C08J 3/00* | (2006.01) |
| *C08F 4/659* | (2006.01) |

(52) U.S. Cl.
CPC .......... *C08F 210/14* (2013.01); *C08F 4/6592* (2013.01); *C08F 8/04* (2013.01); *C08J 3/00* (2013.01); *C08F 4/65908* (2013.01); *C08F 4/65927* (2013.01); *C08F 2410/01* (2013.01); *C08J 2323/24* (2013.01)

(58) Field of Classification Search
None
See application file for complete search history.

(56) References Cited

U.S. PATENT DOCUMENTS

| | | | | |
|---|---|---|---|---|
| 6,281,320 | B1 * | 8/2001 | Kao ........................ | C08F 10/00 502/152 |
| 2010/0317904 | A1 | 12/2010 | Small et al. | |
| 2011/0040052 | A1 | 2/2011 | Bburton et al. | |
| 2012/0040878 | A1 | 2/2012 | Katayama et al. | |
| 2012/0245312 | A1 | 9/2012 | Holtcamp et al. | |
| 2012/0322704 | A1 | 12/2012 | Tamoto | |
| 2013/0023633 | A1 | 1/2013 | Holtcamp et al. | |
| 2013/0102745 | A1 * | 4/2013 | Yabukami ............ | C08F 4/6592 526/126 |
| 2014/0309151 | A1 * | 10/2014 | Shimizu ................ | C08F 210/14 508/591 |

FOREIGN PATENT DOCUMENTS

| | | | |
|---|---|---|---|
| JP | 9-255711 | A | 9/1997 |
| JP | 2000-281708 | A | 10/2000 |
| JP | 2000-344816 | | * 12/2000 |
| JP | 2000-344816 | A | 12/2000 |
| JP | 2000-344817 | A | 12/2000 |
| JP | 2005-200453 | A | 7/2005 |
| JP | 2005-200454 | A | 7/2005 |
| JP | 2008-297555 | A | 12/2008 |
| JP | 2009-514991 | A | 4/2009 |
| JP | 2010-77336 | A | 4/2010 |
| JP | 2010-534762 | A | 11/2010 |
| JP | 2011-514396 | A | 5/2011 |
| JP | 2011-174000 | A | 9/2011 |
| JP | 2011-246559 | A | 12/2011 |
| JP | 4997119 | B2 | 8/2012 |
| JP | 2013-501846 | A | 1/2013 |
| WO | 2006/022355 | A1 | 3/2006 |
| WO | 2007/011459 | A1 | 1/2007 |
| WO | 2009/137264 | A1 | 11/2009 |
| WO | 2010/074233 | A1 | 7/2010 |
| WO | 2011/019541 | A1 | 2/2011 |
| WO | WO 2011/148968 | | * 12/2011 |
| WO | WO 2013/015175 | | * 1/2013 |

OTHER PUBLICATIONS

Computer Translation of JP 2000-344816 (2000).*
International Search Report issued Jun. 17, 2014 in PCT/JP2014/056579 filed Mar. 12, 2014.

* cited by examiner

*Primary Examiner* — Robert C Boyle
(74) *Attorney, Agent, or Firm* — Oblon, McClelland, Maier & Neustadt, L.L.P.

(57) ABSTRACT

Provided is a method for producing an α-olefin polymer, comprising the step of polymerizing one or more kinds of α-olefins each having 3 to 30 carbon atoms with a polymerization catalyst obtained by using: (A) a metallocene compound; (B) an ionic compound capable of reacting with the metallocene compound to transform the compound into a cation; (C) an organometallic compound; and (D) one or more kinds of compounds selected from the group consisting of (d-1) an alcohol, (d-2) a phenol, and (d-3) an ether compound, the catalyst having a ratio between the component (A) and the component (D) of from 10:1 to 1:100 in terms of a molar ratio, and having a ratio of the component (D) to the component (C) of less than 1 in terms of a molar ratio.

12 Claims, No Drawings

METHODS FOR PRODUCING α-OLEFIN POLYMER AND HYDROGENATED α-OLEFIN POLYMER

TECHNICAL FIELD

The present invention relates to a method for producing an α-olefin polymer and a hydrogenated α-olefin polymer.

BACKGROUND ART

A characteristic which a lubricating oil for automobiles and industrial machines has heretofore been required to have is, for example, a relatively high viscosity in terms of lubricating performance. However, in consideration of an environment conservation for which there are growing concerns in recent years, a further reduction in fuel consumption, further energy savings, and an increase in lifetime have been demanded, and hence a synthetic lubricating oil having a more excellent viscosity characteristic (higher viscosity index), a more excellent low-temperature characteristic (low-temperature flowability), and more excellent oxidation stability than those of a poly-α-olefin that has heretofore been used has been demanded. A conventional hydrocarbon-based synthetic lubricating oil is obtained by, for example, a method involving polymerizing 1-decene, or 1-decene and 1-dodecene, through the use of aluminum chloride or aluminum bromide as a catalyst (Patent Literature 1). However, the viscosity index, pour point, and durability of the resultant α-olefin polymer have not been sufficient.

In recent years, an attempt has been made to produce a high-performance α-olefin (co)polymer with a metallocene catalyst, and it has been known that an α-olefin copolymer having an excellent viscosity characteristic, an excellent low-temperature characteristic, and excellent durability is obtained (Patent Literatures 2 to 14).

CITATION LIST

Patent Literature

PTL 1: JP 4997119 B2
PTL 2: WO 2007/011459 A1
PTL 3: JP 2011-514396 A
PTL 4: JP 2009-514991 A
PTL 5: JP 2010-534762 A
PTL 6: US 2010/0317904 A1
PTL 7: WO 2009/137264 A1
PTL 8: WO 2011/019541 A1
PTL 9: JP 2005-200454 A
PTL 10: JP 2005-200453 A
PTL 11: WO 2006/022355 A1
PTL 12: JP 2010-077336 A
PTL 13: JP 2008-297555 A
PTL 14: WO 2010/074233 A1

SUMMARY OF INVENTION

Technical Problem

However, heretofore, the production of a high-performance α-olefin copolymer has resulted in a high cost of catalyst and hydrogen, or has required a special high-pressure apparatus. For example, in each of the methods described in Patent Literatures 2 to 8 and 14, the amount of a catalyst to be used is large, in each of the methods described in Patent Literatures 7 and 8, high-pressure hydrogen is needed, and in each of the methods described in Patent Literatures 9 to 13, a large amount of hydrogen is needed. Accordingly, the development of a production method that is reduced in catalyst amount and does not require any special production apparatus has been demanded.

The present invention has been made in view of the above-mentioned circumstances, and an object of the present invention is to provide a method for efficiently producing an α-olefin polymer and a hydrogenated α-olefin polymer with a metallocene compound.

Solution to Problem

The inventors of the present invention have made extensive investigations. As a result, the inventors have found that upon polymerization of an α-olefin with a metallocene compound, reaction efficiency is drastically improved by adding small amounts of alcohols, phenols, and ether compounds to a catalyst system, and have found that the above-mentioned problems can be solved. The present invention has been completed on the basis of such findings.

That is, according to embodiments of the present invention, there are provided the following inventions.

[1] A method for producing an α-olefin polymer, comprising the step of polymerizing one or more kinds of α-olefins each having 3 to 30 carbon atoms with a polymerization catalyst obtained by using:
(A) a metallocene compound;
(B) an ionic compound capable of reacting with the metallocene compound to transform the compound into a cation;
(C) an organometallic compound; and
(D) one or more kinds of compounds selected from the group consisting of (d-1) an alcohol, (d-2) a phenol, and (d-3) an ether compound, the catalyst having a ratio between the component (A) and the component (D) of from 10:1 to 1:100 in terms of a molar ratio, and having a ratio of the component (D) to the component (C) of less than 1 in terms of a molar ratio.

[2] The method for producing an α-olefin polymer according to Item [1], wherein (A) the metallocene compound is a two-crosslinked metallocene compound.

[3] The method for producing an α-olefin polymer according to Item [1] or [2], wherein (A) the metallocene compound is a two-crosslinked metallocene compound represented by the following general formula (I):

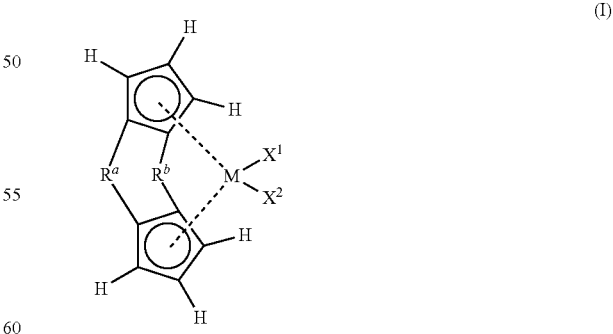

wherein $R^a$ and $R^b$ each independently represent a linking group represented by the following general formula -[L(R$^1$)(R$^2$)]$_n$—, $X^1$ and $X^2$ each independently represent a hydrogen atom, a halogen atom, a hydrocarbon group having 1 to 20 carbon atoms, or an organic group having 1 to 20 carbon atoms, the organic group containing one or more kinds of atoms selected from a halogen atom, a silicon atom, an oxygen atom, a sulfur atom, a nitrogen atom, and a phosphorus atom, M represents a transition metal belonging to any one of Groups 4 to 6 of the periodic table, n represents an integer of from 1 to 3, $R^1$ and $R^2$ each independently represent a hydrogen atom, a halogen atom, a hydrocarbon group having 1 to 20 carbon atoms, or a halogen-containing hydrocarbon group having 1 to 20 carbon atoms, and L represents an atom belonging to Group 14 of the periodic table.

[4] The method for producing an α-olefin polymer according to any one of Items [1] to [3], wherein the polymerization catalyst is prepared by performing a first step of mixing at least (A) the metallocene compound and (C) the organometallic compound, and a second step of mixing at least a mixture obtained in the first step and the component (D) in this order.

[5] The method for producing an α-olefin polymer according to any one of Items [1] to [3], wherein the polymerization catalyst is prepared by performing a first step of mixing at least (C) the organometallic compound and the component (D), and a second step of mixing at least a mixture obtained in the first step and (A) the metallocene compound in this order.

[6] The method for producing an α-olefin polymer according to any one of Items [1] to [5], wherein (d-1) the alcohol and (d-2) the phenol each have 1 to 8 carbon atoms.

[7] The method for producing an α-olefin polymer according to Item [6], wherein (d-1) the alcohol and (d-2) the phenol each have 1 to 6 carbon atoms.

[8] The method for producing an α-olefin polymer according to any one of Items [1] to [7], wherein (d-3) the ether compound has a total of 8 or less carbon atoms.

[9] The method for producing an α-olefin polymer according to any one of Items [1] to [8], wherein the α-olefin has 6 to 20 carbon atoms.

[10] The method for producing an α-olefin polymer according to Item [9], wherein the α-olefin has 8 to 14 carbon atoms.

[11] The method for producing an α-olefin polymer according to any one of Items [1] to [10], wherein the α-olefin polymer has a kinematic viscosity at 100° C. of from 30 mm²/s to 1,000 mm²/s.

[12] A method for producing a hydrogenated α-olefin polymer, comprising: producing an α-olefin polymer by the production method of any one of Items [1] to [11]; and hydrogenating the α-olefin polymer.

[13] The method for producing a hydrogenated α-olefin polymer according to Item [12], wherein the hydrogenated α-olefin polymer has a kinematic viscosity at 100° C. of from 30 mm²/s to 1,000 mm²/s.

Advantageous Effects of Invention

According to the embodiments of the present invention, the method for efficiently producing an α-olefin polymer and a hydrogenated α-olefin polymer with a metallocene compound can be provided.

DESCRIPTION OF EMBODIMENTS

A method for producing an α-olefin polymer according to the present invention comprises the step of polymerizing one or more kinds of α-olefins each having 3 to 30 carbon atoms with a polymerization catalyst obtained by using: (A) a metallocene compound; (B) an ionic compound capable of reacting with the metallocene compound to transform the compound into a cation; (C) an organometallic compound; and one or more kinds of compounds selected from the group consisting of (d-1) an alcohol, (d-2) a phenol, and (d-3) an ether compound, the catalyst having a ratio between the component (A) and the component (D) of from 10:1 to 1:100 in terms of a molar ratio, and having a ratio of the component (D) to the component (C) of less than 1 in terms of a molar ratio.

It should be noted that the α-olefin polymer produced by the present invention includes a copolymer produced by using a plurality of kinds of α-olefins as raw materials.

The α-olefin polymer obtained by the production method for the present invention is preferably useful as a high-viscosity lubricating oil excellent in viscosity characteristic (viscosity index) and low-temperature characteristic (low-temperature flowability).

(A) Metallocene Compound

Specific examples of (A) the metallocene compound include compounds of a non-crosslinking type, a single-crosslinking type, and a two-crosslinking type. However, a two-crosslinked metallocene compound represented by the following general formula (I) is preferably used.

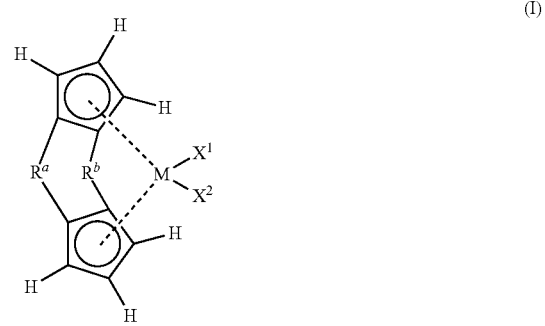

(I)

In the formula, $X^1$ and $X^2$ each independently represent a hydrogen atom, a halogen atom, a hydrocarbon group having 1 to 20 carbon atoms, or an organic group having 1 to 20 carbon atoms, the organic group containing one or more kinds of atoms selected from a halogen atom, a silicon atom, an oxygen atom, a sulfur atom, a nitrogen atom, and a phosphorus atom, M represents a transition metal belonging to any one of Groups 4 to 6 of the periodic table, and is preferably zirconium, titanium, or hafnium.

$R^a$ and $R^b$ each independently represent a linking group represented by -[L(R¹)(R²)]ₙ—, and preferred examples thereof include —C(R¹)(R²)—, —Si(R¹)(R²)—, —C(R¹)(R²)—C(R¹)(R²)—, and —Si(R¹)(R²)—Si(R¹)(R²)—. n represents an integer of from 1 to 3.

$R^1$ and $R^2$ each independently represent a hydrogen atom, a halogen atom, a hydrocarbon group having 1 to 20 carbon atoms, or a halogen-containing hydrocarbon group having 1 to 20 carbon atoms, preferably a hydrogen atom or a hydrocarbon group having 1 to 4 carbon atoms, more preferably a hydrogen atom or an alkyl group having 1 to 4 carbon atoms.

L represents an atom belonging to Group 14 of the periodic table, preferably a carbon atom or a silicon atom.

Specific examples of the two-crosslinked metallocene compound represented by the general formula (I) may include dichlorinated products such as (1,1'-ethylene)(2,2'-ethylene)biscyclopentadienylzirconium dichloride, (1,1'-dimethylsilylene)(2,2'-dimethylsilylene)biscyclopentadienylzirconium dichloride, (1,1'-dimethylsilylene)(2,2'-ethylene)

biscyclopentadienylzirconium dichloride, (1,1'-isopropylidene)(2,2'-dimethylsilylene)biscyclopentadienylzirconium dichloride, (1,1'-isopropylidene)(2,2'-isopropylidene)bis(3-methylcyclopentadienyl)zirconium dichloride, and dimethylated products, diethylated products, dihydrogenated products, diphenylated products, and dibenzylated products of the compounds, as well as a titanium or hafnium complexes thereof.

One kind of those two-crosslinked metallocene compounds to be used as the component (A) may be used, or two or more kinds of them may be used in combination.

(B) Ionic Compound

Any ionic compound that may react with the metallocene compound as the component (A) to convert to a cation can be used as the component (B), and a compound represented by the following general formula (V) or (VI) can be preferably used.

$$([L^1-R^3]^{k+})_a([Z]^-)_b \quad (V)$$

$$([L^2]^{k+})_a([Z]^-)_b \quad (VI)$$

In the general formula (V), $L^1$ represents a Lewis base and $R^3$ represents a hydrogen atom, an alkyl group having 1 to 20 carbon atoms, or a hydrocarbon group having 6 to 20 carbon atoms selected from an aryl group, an alkylaryl group, and an arylalkyl group.

Here, specific examples of $L^1$ may include: amines such as ammonia, methyl amine, aniline, dimethyl amine, diethyl amine, N-methyl aniline, diphenyl amine, N,N-dimethyl aniline, trimethyl amine, triethyl amine, tri-n-butyl amine, methyldiphenyl amine, pyridine, p-bromo-N,N-dimethyl aniline, and p-nitro-N,N-dimethyl aniline; phosphines such as triethyl phosphine, triphenyl phosphine, and diphenyl phosphine; thioethers such as tetrahydrothiophene; esters such as ethyl benzoate; and nitriles such as acetonitrile and benzonitrile. Specific examples of $R^3$ may include a hydrogen atom, a methyl group, an ethyl group, a benzyl group, and a trityl group.

In the general formula (VI), $L^2$ represents $M^1$, $R^4R^5M^2$, $R^6{}_3C$, or $R^7M^2$. $R^4$ and $R^5$ each independently represent a cyclopentadienyl group, a substituted cyclopentadienyl group, an indenyl group, or a fluorenyl group. $R^6$ represents an alkyl group having 1 to 20 carbon atoms, or a hydrocarbon group having 6 to 20 carbon atoms selected from an aryl group, an alkylaryl group, and an arylalkyl group. $R^7$ represents a macrocyclic ligand such as tetraphenylporphyrin or phthalocyanine.

$M^1$ contains an element belonging to any one of Groups 1 to 3, 11 to 13, and 17 of the periodic table, and $M^2$ represents an element belonging to any one of Groups 7 to 12 of the periodic table.

Here, specific examples of $R^4$ and $R^5$ may include a cyclopentadienyl group, a methylcyclopentadienyl group, an ethylcyclopentadienyl group, and a pentamethylcyclopentadienyl group. Specific examples of $R^6$ may include a phenyl group, a p-tolyl group, and a p-methoxyphenyl group, and specific examples of $R^7$ may include tetraphenylporphyrin and phthalocyanine. In addition, specific examples of $M^1$ may include Li, Na, K, Ag, Cu, Br, I, and $I_3$, and specific examples of $M^2$ may include Mn, Fe, Co, Ni, and Zn.

In the general formulae (V) and (VI):
k represents the ionic valence of each of $[L^1-R^3]$ and $[L^2]$ which is an integer of 1 to 3, a represents an integer of 1 or more, and b=(k×a);

$[Z]^-$ represents an uncoordinated anion $[Z^1]^-$ or $[Z^2]^-$.

$[Z^1]^-$ represents an anion obtained by bonding multiple groups to an element, that is, $[M^3G^1G^2 \ldots G^f]^-$. Here, $M^3$ represents an element belonging to any one of Groups 5 to 15 of the periodic table, or preferably an element belonging to any one of Groups 13 to 15 of the periodic table. $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a hetero atom-containing hydrocarbon group having 2 to 20 carbon atoms. Two or more of $G^1$ to $G^f$ may form a ring. f represents an integer obtained from [(valence of central metal $M^3$)+1].

$[Z^2]^-$ represents a conjugate base of a Bronsted acid alone, or a combination of a Bronsted acid and a Lewis acid, the Bronsted acid having a logarithm of the reciprocal acid dissociation constant (pKa) of −10 or less, or a conjugate base of an acid generally defined as a superacid. In addition, $[Z^2]^-$ may be coordinated with a Lewis base.

Here, specific examples of $M^3$ in $[Z^1]^-$, i.e., $[M^3G^1G^2 \ldots G^f]^-$ may include B, Al, Si, P, As, and Sb, and preferred are B and Al. Further, specific examples of $G^1$, and $G^2$ to $G^f$ may include: a dimethylamino group and a diethylamino group as dialkylamino groups; a methoxy group, an ethoxy group, an n-propoxy group, and a phenoxy group as alkoxy groups or aryloxy groups; a methyl group, an ethyl group, an n-propyl group, an isopropyl group, an n-butyl group, an isobutyl group, an n-octyl group, a n-eicosyl group, a phenyl group, a p-tolyl group, a benzyl group, a 4-t-butylphenyl group, and a 3,5-dimethylphenyl group as hydrocarbon groups; a fluorine atom, a chlorine atom, a bromine atom, and an iodine atom as halogen atoms; a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, a bis(trimethylsilyl)methyl group as hetero atom-containing hydrocarbon groups; and a pentamethylantimony group, a trimethylsilyl group, a trimethylgermyl group, a diphenylarsine group, a dicyclohexylantimony group, and a diphenylboron group as organic metalloid groups.

Further, specific examples of $[Z^2]^-$ as an uncoordinated anion, that is, conjugate base of a Bronsted acid alone, or a combination of a Bronsted acid and a Lewis acid, the Bronsted acid having pKa of −10 or less, may include a trifluoromethanesulfonate anion $(CF_3SO_3)^-$, a bis(trifluoromethanesulfonyl)methyl anion, a bis(trifluoromethanesulfonyl)benzyl anion, a bis(trifluoromethanesulfonyl)amide, a perchlorate anion $(ClO_4)^-$, a trifluoroacetate anion $(CF_3COO)^-$, a hexafluoroantimony anion $(SbF_6)^-$, a fluorosulfonate anion $(FSO_3)^-$, a chlorosulfonate anion $(ClSO_3)^-$, a fluorosulfonate anion/antimony pentafluoride $(FSO_3/SbF_5)^-$, a fluorosulfonate anion/arsenic pentafluoride $(FSO_3/AsF_5)^-$, and a trifluoromethanesulfonate anion/antimony pentafluoride $(CF_3SO_3/SbF_5)^-$.

Specific examples of such component (B) may include triethylammonium tetraphenylborate, tri-n-butylammonium tetraphenylborate, trimethylammonium tetraphenylborate, tetraethylammonium tetraphenylborate, methyl(tri-n-butyl) ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butyl-ammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium)tetrakis(pentafluorophenyl)borate, benzyl(2-cyanopyridinium)tetrakis(pentafluorophenyl)borate, methyl(4-cyanopyridinium)tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrin manganese tetraphenylborate, ferrocenium tetrakis(pentafluorophenyl)borate, (1,1'-dimethylferrocenium)tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrin manganese tetrakis(pentafluorophenyl)borate, silver tetrafluoroborate, silver hexafluorophosphate, silver hexafluoroarsenate, sliver perchlorate, silver trifluoroacetate, and silver trifluoromethanesulfonate.

One kind of component (B) may be used alone, or two or more kinds thereof may be used in combination.

(C) Organometallic Compound

A compound selected from an organic aluminum compound and an organic zinc compound is suitably used as (C) the organometallic compound.

A compound represented by the general formula (VII) is used as the organic aluminum compound.

$$(R^8)_v AlQ_{3-v} \qquad (VII)$$

(In the formula, $R^8$ represents an alkyl group having 1 to 10 carbon atoms, Q represents a hydrogen atom, an alkoxy group having 1 to 20 carbon atoms, an aryl group having 6 to 20 carbon atoms, or a halogen atom, and v represents an integer of from 1 to 3 or 1.5.)

A compound represented by the following general formula (VIII):

$$(R^9)_u ZnP_{2-u} \qquad (VIII)$$

where: $R^9$ represents an alkyl group having 1 to 10 carbon atoms; P represents an alkoxy group having 1 to 20 carbon atoms, an aryl group having 6 to 20 carbon atoms, or a halogen atom; and u represents an integer of from 1 to 2, may be used as the organic zinc compound.

Specific examples of the organic aluminum compound represented by the general formula (VII) may include trimethylaluminum, triethylaluminum, tri-n-propylaluminum, triisopropylaluminum, tri-n-butylaluminum, triisobutylaluminum, triheptylaluminum, trioctylaluminum, diisobutylaluminum hydride, diethylaluminum hydride, dimethylaluminum chloride, diethylaluminum chloride, methylaluminum dichloride, ethylaluminum dichloride, dimethylaluminum fluoride, and ethylaluminum sesquichloride.

Specific examples of the organic zinc compound represented by the general formula (VIII) may include dimethylzinc, diethylzinc, dibutylzinc, and dioctylzinc.

One kind of component (C) may be used alone, or two or more kinds thereof may be used in combination.

A use ratio between the components (A) and (B) is preferably from 10:1 to 1:100, more preferably from 2:1 to 1:10 in terms of a molar ratio. A molar ratio between the component (A) and the component (C) is preferably from 1:1 to 1:10,000, more preferably from 1:10 to 1:1,000. In addition, one kind each of the component (B) and the component (C) can be used, or two or more kinds each thereof can be used in combination. Even when two or more kinds are used in combination, the use ratio of the total of the two or more kinds preferably falls within the range. When the use ratio deviates from the range, the activity of the catalyst may reduce.

In the production method of the present invention, one or more kinds of compounds selected from the group consisting of (d-1) an alcohol, (d-2) a phenol, and (d-3) an ether compound is used as the component (D).

(d-1) Alcohols

An alcohol having 1 to 20 carbon atoms is suitably used as (d-1) the alcohol, an alcohol having 1 to 8 carbon atoms is preferably used, and an alcohol having 1 to 6 carbon atoms is more preferably used. Specific examples of the alcohols include methyl alcohol, ethyl alcohol, 1-propyl alcohol, 2-propyl alcohol, 1-butyl alcohol, 2-butyl alcohol, isobutyl alcohol, t-butyl alcohol, 1-pentyl alcohol, 2-pentyl alcohol, 3-methyl-1-butyl alcohol, 1-hexyl alcohol, cyclohexyl alcohol, 1-heptyl alcohol, 1-octyl alcohol, 2-ethylhexyl alcohol, triphenylmethanol, 1,2-ethanediol, 1,2-propanediol, benzyl alcohol, and α-methylbenzyl alcohol. One kind of those components may be used alone, or two or more kinds thereof may be used in combination.

(d-2) Phenols

A phenol having 6 to 20 ring-forming carbon atoms is preferably used as (d-2) the phenol, a phenol having 6 to 14 ring-forming carbon atoms is more preferably used, and a phenol having 6 to 12 ring-forming carbon atoms is still more preferably used. Specific examples of the phenols include phenol, catechol, cresol, naphthol, 4-phenylphenol, thymol, and bisphenol A. One kind of those components may be used alone, or two or more kinds thereof may be used in combination.

(d-3) Ether Compounds

When (d-3) the ether compound is represented by the general formula $R^{10}$—O—$R^{11}$, $R^{10}$ and $R^{11}$ each independently represent a hydrocarbon group having 1 to 20 carbon atoms or a halogen-containing hydrocarbon group having 1 to 20 carbon atoms, and a compound in which the total number of carbon atoms of $R^{10}$ and $R^{11}$ is 8 or less is suitably used.

Specific examples of the ether compound include dimethyl ether, diethyl ether, dipropyl ether, dibutyl ether, diamyl ether, dioctyl ether, didecyl ether, methyl n-butyl ether, methyl isobutyl ether, methyl t-butyl ether, ethyl n-butyl ether, ethyl isobutyl ether, ethyl t-butyl ether, methyl phenyl ether, chloromethyl methyl ether, chloromethyl ethyl ether, bromomethyl methyl ether, 2,2-dichloroethyl methyl ether, 2-chloroethyl methyl ether, 2-bromoethyl methyl ether, 2-bromoethyl ethyl ether, 2-chloroethyl ethyl ether, α,α-dichloromethyl methyl ether, 1-chloro-2,2,2-trifluoroethyl difluoromethyl ether, 2-chloro-1,1,2-trifluoroethyl difluoromethyl ether, difluoromethyl-2,2,2-trifluoroethyl ether, 2-chloro-1,1,2-trifluoroethyl methyl ether, 2,2-dichloro-1,1-difluoroethyl methyl ether, 2-bromo-1,1,2-trifluoroethyl ethyl ether, 2-chloro-1,1,2-trifluoroethyl ethyl ether, ethyl-1,1,2,2-tetrafluoroethyl ether, heptafluoropropyl-1,2,2,2-tetrafluoroethyl ether, n-butyl-1,1,2,2-tetrafluoroethyl ether, 4-bromophenyl trifluoromethyl ether, tetrahydrofurfuryl chloride, 2-bromofuran, 3-bromofuran, perfluoro-2-butyltetrahydrofuran, bis(4-fluorophenyl) ether, 2-bromoethyl ether, 2-chloroethyl ether, 1,2-dichloroethyl ethyl ether, pentafluoroanisole, 2,3,5,6-pentafluoroanisole, 2,4,6-tribromoanisole, 2,3,4-trichloroanisole, 2,4,6-trichloroanisole, 2,4,5-trifluoroanisole, 2-bromo-4-fluoroanisole, 4-bromo-2-fluoroanisole, 2,4-dibromoanisole, a, 4-dichloroanisole, 2,3-dichloroanisole, 2,4-difluoroanisole, 2-bromoanisole, 2-chloroanisole, 2-fluoroanisole, 2-iodoanisole, and benzyl-3-bromopropyl ether. One kind of those components may be used alone, or two or more kinds thereof may be used in combination.

One kind selected from the components (d-1) to (d-3) can be used alone as the component (D), or two or more kinds selected therefrom can be used in combination.

A use ratio between the component (A) and the component (D) in the production method of the present invention is preferably from 10:1 to 1:100, more preferably from 1:1 to 1:50, still more preferably from 1:1 to 1:30 in terms of a molar ratio between the component (A) and the total of the components (d-1) to (d-3). With regard to a use ratio between the component (C) and the component (D), the molar ratio of the component (D) to the component (C) needs to be less than 1. The use ratio is preferably from 10:9 to 1,000:1 in terms of the molar ratio between the component (C) and the component (D). When the amount of the component (D) is larger than that of the component (C), the component (D) may serve to reduce the activity. For example, alcohols as one kind of the component (D) are generally added in a large amount as a terminator after the polymerization reaction in many cases. In the present invention, a small amount of the component (D) is added before the polymerization, whereby the component serves as an activity improver that has not heretofore been known.

In the present invention, it is sufficient that the polymerization catalyst be formed by using the component (A), the component (B), the component (C), and the component (D), and the order in which the components are mixed is not particularly limited. However, for example, a method in which a first step of mixing at least the component (A) and the component (C), and a second step of mixing at least a mixture obtained in the first step and the component (D) are performed in the stated order, or a method in which a first step of mixing at least the component (C) and the component (D), and a second step of mixing at least a mixture obtained in the first step and (A) the metallocene compound are performed in the stated order is preferred from the viewpoint of reaction efficiency. The component (B) may be added at any stage before or after any one of the steps.

In addition, the steps can be performed in the presence or absence of a carrier. However, when the carrier is used, the polymerization catalyst is formed by causing a proper carrier to carry at least one kind of the catalyst components and bringing the component into contact with any other component. The kind of the carrier is not particularly limited, and any one of an inorganic oxide carrier, an inorganic carrier except the inorganic oxide carrier, and an organic carrier can be used. However, the inorganic oxide carrier or the inorganic carrier except the inorganic oxide carrier is particularly preferred in terms of morphology control.

Specific examples of the inorganic oxide carrier include $SiO_2$, $Al_2O_3$, MgO, $ZrO_2$, $TiO_2$, $Fe_2O_3$, $B_2O_3$, CaO, ZnO, BaO, and $ThO_2$, and mixtures of them such as silica alumina, zeolite, ferrite, and glass fibers. Among them, $SiO_2$ and $Al_2O_3$ are particularly preferred. It should be noted that the above inorganic oxide carrier may contain a small amount of, for example, a carbonate, nitrate, or sulfate. Meanwhile, examples of the carrier except the foregoing include magnesium compounds represented by a general formula "Mg$(R^{17})_aX_b$" typified by, for example, magnesium compounds such as $MgCl_2$ and $Mg(OC_2H_5)_2$, and complex salts of the compounds. Here, $R^{17}$ represents an alkyl group having 1 to 20 carbon atoms, an alkoxy group having 1 to 20 carbon atoms, or an aryl group having 6 to 20 carbon atoms, X represents a halogen atom or an alkyl group having 1 to 20 carbon atoms, a represents from 0 to 2, b represents from 0 to 2, and a+b=2. The respective $R^{17}$'s or the respective X's may be identical to or different from each other.

In addition, examples of the organic carrier may include: polymers such as a polystyrene, a styrene-divinylbenzene copolymer, a polyethylene, a polypropylene, a substituted polystyrene, and a polyallylate; starch; and carbon. The carrier used in the present invention is preferably, for example, $MgCl_2$, $MgCl(OC_2H_5)$, $Mg(OC_2H_5)_2$, $SiO_2$, or $Al_2O_3$. Although the properties of the carrier vary depending on the kind of, and a production process for, the carrier, the carrier has an average particle diameter of typically from 1 μm to 300 μm, preferably from 10 μm to 200 μm, more preferably from 20 μm to 100 μm. When the particle diameter is small, the amount of a fine powder in the α-olefin polymer increases. When the particle diameter is large, the amount of coarse particles in the α-olefin polymer increases to be responsible for a reduction in bulk density or the clogging of a hopper. In addition, the carrier has a specific surface area of typically from 1 $m^2/g$ to 1,000 $m^2/g$, preferably from 50 $m^2/g$ to 500 $m^2/g$ and a pore volume of typically from 0.1 $cm^3/g$ to 5 $cm^3/g$, preferably from 0.3 $cm^3/g$ to 3 $cm^3/g$. When one of the specific surface area and the pore volume deviates from the above range, the activity of the catalyst may reduce. It should be noted that the specific surface area and the pore volume can each be determined from, for example, the volume of a nitrogen gas adsorbed in accordance with a BET method (see "J. Am. Chem. Soc., 60, 309 (1983)"). Further, the above carrier is desirably used after having been baked at typically from 150° C. to 1,000° C., preferably from 200° C. to 800° C.

When the carrier is caused to carry at least one kind of catalyst component, the carrier is desirably caused to carry at least one of the components (A) to (D), or preferably all of the components (A) to (D). Although a method for causing the carrier to carry at least one of the components (A) to (D) is not particularly limited, available is, for example, a method involving mixing at least one of the components (A) to (D), and the carrier, a method involving treating the carrier with a halogen-containing silicon compound and mixing the treated product with at least one of the components (A) to (D) in an inert solvent, a method involving causing the carrier, one or more kinds of the components (A) to (D), and the halogen-containing silicon compound to react with one another, a method involving causing the carrier to carry any one or more of the components (A) to (D) and mixing the resultant with the rest of the components, a method involving mixing a product obtained by a contact reaction between the components (A) to (D) with the carrier, or a method involving causing the carrier to coexist at the time of a contact reaction between the components (A) to (D).

The component (D) may be brought into contact after the carrier has been caused to carry the component (B) and the component (C), preferably the components (A) to (C), or may be added at the time of the polymerization reaction.

The catalyst thus obtained may be used in the polymerization after having been extracted as a solid by removing a solvent by distillation once, or may be used as it is in the polymerization. In addition, in the present invention, the catalyst can be produced by performing an operation of causing the carrier to carry at least one of the components (A) to (C) in a polymerization system. Catalyst particles to be used can be produced by, for example, a method involving adding the components (A) to (C), the carrier, and the component (D), adding normal pressure to 2 MPa of a gaseous olefin such as propylene, and performing preliminary polymerization at from −20° C. to 200° C. for from about 1 minute to 2 hours, or a method involving adding a liquid α-olefin such as 1-hexene and performing preliminary polymerization at from −20° C. to 200° C. for from about 1 minute to 2 hours.

In the present invention, it is desired that a use ratio between the component (B) and the carrier be preferably from 1:5 to 1:10,000, more preferably from 1:10 to 1:500 in terms of a mass ratio, and a use ratio between the component (C) and the carrier be preferably from 1:0.5 to 1:1,000, more preferably from 1:1 to 1:50 in terms of a mass ratio. When two or more kinds of catalyst components (B) are used as a mixture, a use ratio between total amount of the components (B) and the carrier desirably falls within the above range in terms of a mass ratio. In addition, it is desired that a use ratio between the component (A) and the carrier be preferably from 1:5 to 1:10,000, more preferably from 1:10 to 1:500 in terms of a mass ratio. In addition, the catalyst in the present invention may contain the components (A) to (D) as main components. A use ratio between the component (B) and the carrier, and a use ratio between the component (A) and the carrier each desirably fall within the above range in terms of a mass ratio. When the use ratio between the component (B) and the carrier or the use ratio between the component (A) and the carrier deviates from the above range, the activity of the catalyst may reduce. The catalyst thus prepared has an average particle diameter of typically from 2 μm to 200 μm, preferably from 10 μm to 150 μm, particularly preferably from 20 μm to 100 μm and a specific surface area of typically from 20 m$^2$/g to 1,000 m$^2$/g, preferably from 50 m$^2$/g to 500 m$^2$/g. When the average particle diameter is less than 2 μm, the amount of a fine powder in the polymer may increase. When the average particle diameter exceeds 200 μm, the amount of coarse particles in the polymer may increase. When the specific surface area is less than 20 m$^2$/g, the activity of the catalyst may reduce. When the specific surface area exceeds 1,000 m$^2$/g, the bulk density of the polymer may reduce. In addition, a transition metal amount in 100 g of the carrier in the catalyst of the present invention is typically from 0.05 g to 10 g, particularly preferably from 0.1 g to 2 g. When the transition metal amount deviates from the above range, the activity of the catalyst may reduce. As described above, an industrially advantageous production method can be obtained by causing the carrier to carry at least one kind of the catalyst components.

Examples of the α-olefins having 3 or more and 30 or less carbon atoms to be used in the present invention include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-icosene, 1-henicosene, 1-docosene, 1-tricosene, 1-tetracosene, 1-pentacosene, 1-hexacosene, 1-heptacosene, 1-octacosene, 1-nonacosene, and 1-triacontene, and one kind or two or more kinds thereof are used. Among them, more preferred are α-olefins having 6 or more and 20 or less carbon atoms, and particularly preferred are α-olefins having 8 or more and 14 or less carbon atoms, which are easily obtainable and inexpensive.

The α-olefin, which may be used as it is in the polymerization reaction, is more preferably treated with an adsorbent such as activated alumina or a molecular sieve before its use because impurities are removed and the activity of the catalyst improves.

In the present invention, a polymerization method is not particularly limited, and any one of the methods including a bulk polymerization method, a solution polymerization method, a suspension polymerization method, a slurry polymerization method, and a vapor phase polymerization method may be employed. With regard to polymerization conditions, a polymerization temperature is typically from 0° C. to 200° C., preferably from 30° C. to 150° C., more preferably from 40° C. to 120° C. In addition, a use ratio of the catalyst to a raw material monomer is such that a molar ratio "raw material monomer/the above component (A)" is preferably from 1 to $10^8$, particularly preferably from 100 to $10^6$. Further, a polymerization time is typically from 5 minutes to 20 hours, and a reaction pressure is preferably from normal pressure to 0.2 MPaG.

In the production method of the present invention, polymerization is preferably performed without a solvent from the viewpoint of productivity, but a solvent may be used. In the case of using a solvent, examples of the solvent which may be used include: aromatic hydrocarbons such as benzene, toluene, xylene, and ethylbenzene; alicyclic hydrocarbons such as cyclopentane, cyclohexane, and methylcyclohexane; aliphatic hydrocarbons such as pentane, hexane, heptane, and octane; and halogenated hydrocarbons such as chloroform and dichloromethane. One kind of solvent may be used alone or two or more kinds thereof may be used in combination. In addition, a monomer such as 1-butene may also be used as the solvent.

In the method for producing an α-olefin polymer of the present invention, the activity of the catalyst is improved by adding hydrogen upon polymerization of an α-olefin. When hydrogen is used, its pressure is typically 0.2 MPaG or less, preferably 0.1 MPaG or less.

In the present invention, preliminary polymerization can be performed by using the catalyst for polymerization. The preliminary polymerization can be performed by bringing, for example, a small amount of an olefin into contact with the catalyst components. However, a method for the preliminary polymerization is not particularly limited, and a known method can be employed. The olefin used in the preliminary polymerization is not particularly limited, and examples of the olefin include ethylene, an α-olefin having 3 to 30 carbon atoms, and mixtures of them. It is advantageous to use the same olefin as the monomer used in the polymerization. In addition, a temperature for the preliminary polymerization is typically from −20° C. to 200° C., preferably from −10° C. to 130° C., more preferably from 0° C. to 80° C. In the preliminary polymerization, an inert hydrocarbon, an aliphatic hydrocarbon, an aromatic hydrocarbon, a monomer, or the like can be used as a solvent. Among them, the aliphatic hydrocarbon or the aromatic hydrocarbon is particularly preferred. Alternatively, the preliminary polymerization may be performed in the absence of any solvent. Conditions for the preliminary polymerization are preferably adjusted so that the amount of a preliminary polymerization product with respect to 1 mmol of a transition metal component in the catalyst may be from 1 g to 10,000 g, particularly from 1 g to 1,000 g. The performance of the preliminary polymerization enables stable expression of the activity and improves the storage stability of the polymer.

In the production method of the present invention, a method of regulating the molecular weight of the α-olefin polymer is a method involving selecting the kinds, usages, and reaction amounts of the respective catalyst components, and the polymerization temperature, or a method involving adding a diluent solvent.

When the α-olefin polymer is used as a lubricating oil or an additive, a monomer and an oligomer component are preferably removed after the above polymerizing step. A method for the removal is, for example, a method involving performing distillation under reduced pressure. In addition, subjecting the α-olefin polymer to a hydrogenation treatment to produce a hydrogenated α-olefin polymer is preferred from the viewpoint of an improvement in the stability. A method for the hydrogenation is not particularly limited, and a known method can be employed.

According to the production method of the present invention, an α-olefin polymer useful as a high-viscosity lubricating base oil excellent in viscosity characteristic (viscosity index), low-temperature characteristic (low-temperature flowability), and durability can be produced with a small amount of a catalyst, and can be industrially produced in an easy manner. Here, the phrase "industrially produced in an easy manner" refers to, for example, the following merits: a pressure at the time of the production is as low as 0.2 MPa or less; the α-olefin is subjected to a reaction at a relatively mild and easy-to-control temperature to which a steam-heating type reactor can correspond; and the step of diluting a reaction liquid with an inert solvent is not needed. In addition, the characteristics of the product such as a viscosity and a viscosity index can be widely changed to the extent that the product is useful as a high-viscosity lubricating base oil by controlling a reaction condition, e.g., regulating the reaction temperature.

The kinematic viscosity of each of the α-olefin polymer and the hydrogenated α-olefin polymer obtained by the present invention at 100° C. measured in conformity with JIS K 2283 is preferably from 30 mm$^2$/s to 1,000 mm$^2$/s, more preferably from 30 mm$^2$/s to 500 mm$^2$/s. When the kinematic viscosity at 100° C. is less than 30 mm$^2$/s, in the case where such polymer is used as a high-viscosity lubricating oil component, durability and the like become insufficient. When the kinematic viscosity at 100° C. is more than 1,000 mm$^2$/s, the viscosity of such polymer is so high that a fuel consumption increases, and an energy-saving property and the like become insufficient.

In addition, the kinematic viscosity of each of the α-olefin polymer and the hydrogenated α-olefin polymer at 40° C. measured in conformity with JIS K 2283 is preferably from 200 mm$^2$/s to 10,000 mm$^2$/s, more preferably from 200 mm$^2$/s to 5,000 mm$^2$/s. When the kinematic viscosity at 40° C. is less than 200 mm$^2$/s, in the case where such polymer is used as a high-viscosity lubricating oil component, the durability and the like become insufficient. When the kinematic viscosity at 40° C. is more than 5,000 mm$^2$/s, the viscosity of such polymer is so high that the fuel consumption increases, and the energy-saving property and the like become insufficient.

In each of the α-olefin polymer and the hydrogenated α-olefin polymer, a viscosity index (VI) calculated from the kinematic viscosity at 40° C. and the kinematic viscosity at 100° C. is preferably 150 or more, more preferably 160 or more from the viewpoint of lubricity in a wide temperature range.

The pour point of each of the α-olefin polymer and the hydrogenated α-olefin polymer obtained by the present invention measured in conformity with JIS K 2269 is preferably −30° C. or less from the viewpoint of lubricity at an extremely low temperature.

The α-olefin polymer obtained by the production method of the present invention preferably satisfies the following characteristics (i) to (iii);
(i) a mesotriad fraction (mm) measured by $^{13}$C-NMR is 40 mol % or less;
(ii) a number-average molecular weight (Mn) measured by gel permeation chromatography (GPC) is from 1,000 to 30,000; and
(iii) a molecular weight distribution (Mw/Mn) measured by GPC is 2.5 or less.

The mesotriad fraction (mm) is a stereoregularity index representing isotacticity and can be determined by means of $^{13}$C-NMR (nuclear magnetic resonance spectrum based on a carbon isotope) according to a method described in, for example, a known document [Macromolecules, 24, 2334 (1991) or Polymer, 30, 1350 (1989)]. The α-olefin polymer obtained by the production method of the present invention has a characteristic of low stereoregularity, and its mesotriad fraction (mm) is 40 mol % or less.

The stereoregularity is described in detail. An α-olefin polymer using a metallocene catalyst is of a structure having a side chain on every other carbon atom of an α-olefin chain portion (main chain), and each side chain can be positioned in two directions. Accordingly, the polymer can have sterically different structures depending on a relationship between the positions of the side chains. A steric relationship in which when two consecutive olefin units in the main chain are viewed, their side chains are positioned in the same direction with respect to the main chain is called a meso structure, and when the polymer has many meso structures, the polymer is said to have high isotacticity. In contrast, a steric relationship in which when the two consecutive olefin units in the main chain are viewed, the side chains are positioned in opposite directions with respect to the main chain is called a racemic structure, and when the polymer has many racemic structures, the polymer is said to have high syndiotacticity. A tacticity is used as an index representing the degree of stereoregularity. The tacticity is represented as an abundance ratio between the meso and racemic structures in a plurality of consecutive monomer units. For example, the case where the number of the plurality of consecutive monomer units is two is called a diad, and the case where their side chains are in a meso positional relationship is represented by m while the case where the side chains are in a racemic positional relationship is represented by r. The case where the number of the monomer units is three is called a triad, and a positional relationship between the side chains of the first and second monomer units, and a positional relationship between the side chains of the second and third monomer units are represented by any one of the following three kinds through the use of the two diad notations (m and r): mm, mr, and rr. Isotacticity in the triad notations is represented by the ratio of a meso triad mm [mm/(mm+mr+rr)], and a higher value for the ratio means that the isotacticity is higher.

The number-average molecular weight (Mn) of the α-olefin polymer obtained by the production method of the present invention measured by means of gel permeation chromatography (GPC) is preferably from 1,000 to 30,000 from the viewpoints of an apparatus lifetime and an energy-saving property when the polymer is used in a wind power generator or the like, and the number-average molecular weight is more preferably from 1,500 to 15,000. In addition, a molecular weight distribution (Mw/Mn) as the ratio of a weight-average molecular weight (Mw) similarly measured by means of GPC to the Mn is preferably 2.5 or less, more preferably 2.0 or less. When the molecular weight distribution (Mw/Mn) is 2.5 or less, the amount of a high-molecular weight component reduces and hence the shear stability of the polymer improves. In addition, the amount of a low-molecular weight component reduces and hence the volatility of the polymer is reduced.

EXAMPLES

Next, the present invention is described in more detail with reference to examples, but the present invention is not limited thereto.

(Evaluation for Catalytic Activity)

The activity of a catalyst was evaluated by the amount of the catalyst used and the degree of the conversion of a monomer (α-olefin) into an α-olefin polymer after a polymerization reaction. The degree of the conversion was determined by a method involving calculating the amount of production of the α-olefin polymer from the density of a reaction liquid through the utilization of a difference in density between the monomer and the α-olefin polymer. Specifically, the calculation was performed while the densities of 1-dodecene, 1-octene, 1-decene, and 1-hexene used in Examples and Comparative Examples at 15° C. were regarded as 0.762 g/ml, 0.720 g/ml, 0.745 g/ml, and 0.678 g/ml, respectively, the density of a polymer, which was to be produced by a reaction at from 102° C. to 105° C., at 15° C. was regarded as 0.846 g/ml, and the density of a polymer, which was to be produced by a reaction at 86° C., at 15° C. was regarded as 0.850 g/ml. The densities were measured in conformity with JIS K 2249.

An α-olefin polymer was evaluated for its physical properties by the following methods.

(1) Kinematic Viscosity and Viscosity Index

A kinematic viscosity was measured in conformity with JIS K 2283. A viscosity index was determined from the kinematic viscosity through a calculation in conformity with JIS K 2283.

(2) Mesotriad Fraction (mm)

Determination was performed by employing $^{13}$C-NMR according to the method described in [Macromolecules. 24, 2334 (1991); Polymer, 30, 1350 (1989)].

(3) Number-average molecular weight and molecular weight distribution (Mw/Mn)

Determination was performed with a GPC-900 manufactured by JASCO Co., Ltd. (column; TOSOH TSK-GEL MULTIPORE HXL-M (two)+Shodex KF801 (one)) and tetrahydrofuran as a solvent at a temperature of 40° C. in terms of polystyrene.

(4) Pour Point

Measurement was performed in conformity with JIS K 2269.

(5) Double Bond Amount

The $^1$H-NMR spectrum of a solution prepared by dissolving the polymer in a heavy chloroform solvent was measured with BRUKER 500 MHz NMR Apparatus manufactured by JEOL Ltd. When an intensity obtained by removing the intensity of a peak resulting from a methyl branch from the intensity of a peak resulting from a methyl group in the $^1$H-NMR spectrum is represented by A, a value A/3 obtained by dividing the intensity by the number of hydrogen atoms, i.e., 3 represents the total amount of the monomer units in the copolymer. A double bond comes in four structures, i.e., vinyl, vinylidene, disubstituted internal olefin, and trisubstituted internal olefin structures, and their peaks are detected at the following points: vinyl: around 4.95 ppm and around 5.8 ppm, vinylidene: 4.7 ppm, disubstituted: 5.4 ppm, trisubstituted: 5.15 ppm. When the intensities of the respective peaks at around 4.95 ppm, around 5.8 ppm, around 4.7 ppm, around 5.4 ppm, and around 5.15 ppm are represented by B, C, D, E, and F, respectively, values (B+C)/3, D/2, E/2, and F each obtained by dividing any such intensity by the number of hydrogen atoms bonded to carbon atoms forming a double bond represent the amounts of the respective double bonds. An amount G (mol %) of the double bonds remaining in the copolymer was calculated by dividing the total amount of the respective double bonds by the total amount of the monomer units, i.e., calculated from the following equation.

$$G=((B+C)/3+D/2+E/2+F)/(A/3)\times 100$$

Production Example 1 [Synthesis of (1,1'-dimethylsilylene)(2,2'-dimethylsilylene)-bis(cyclopentadienyl) zirconium dichloride]

About 13.8 g (600 mmol) of metal Na and 400 ml of dry tetrahydrofuran (THF) were loaded into a 1,000-ml three-necked flask replaced with nitrogen, and the mixture was stirred at 0° C. 5 minutes after that, 1 to 2 ml of cyclopentadiene were dropped to the mixture. Once the generation of hydrogen stopped, 1 to 2 ml of cyclopentadiene were newly added to the resultant mixture. The above operation was repeated until a total of 50 ml (600 mmol) of cyclopentadiene were added. The reaction solution changed from a colorless, transparent one to an incarnadine one. After THF had been removed by distillation under reduced pressure, the resultant crystal was washed with hexane twice and solidified by drying under reduced pressure. As a result, cyclopentadienyl sodium as a pink powder was obtained.

457 ml of THF were added to 43.0 g (480 mmol) of cyclopentadienyl sodium at 0° C., and the mixture was stirred. The mixture was cooled to −78° C., and 29.2 ml (480 mmol) of dichlorodimethylsilane were slowly dropped to the solution. The solution changed from a pink one to a white one. After the solution had been stirred at room temperature overnight, THF was removed by distillation. As a result, a yellow powder [Compound (1)] was obtained.

Compound (1) was extracted with 150 ml of hexane, and the supernatant was transferred to a 1,000-ml three-necked flask replaced with nitrogen. After the supernatant had been cooled to −78° C., 175.8 ml (480 mmol) of n-butyllithium (2.73 mol/l) were dropped to the supernatant. The reaction solution changed from a yellow one to an opaque one. After the solution had been stirred at room temperature overnight, the supernatant was removed through filtration. The resultant white solid was washed with 100 ml of hexane. The washed product was dried under reduced pressure. As a result, a dilithium salt [Compound (2)] as a white powder was obtained.

50 ml of diethyl ether and 100 ml of hexane were added to 27.4 g (137 mmol) of Compound (2). After the mixture had been cooled to −78° C., 16.7 ml (137 mmol) of dichlorodimethylsilane were slowly dropped to the mixture. After the resultant mixture had been stirred at room temperature for 5 hours, the precipitate was removed by filtration, and the filtrate was concentrated. Then, recrystallization from hexane was performed. As a result, 4.05 g of Compound (3) as a needle-like transparent crystal were obtained (in 12% yield).

In a 200-ml Schlenk flask replaced with nitrogen, 4.05 g (16.6 mmol) of Compound (3) were dissolved in 60 ml of hexane, and the solution was stirred. After the solution had been cooled to −78° C., 12.1 ml (33.1 mmol) of n-butyllithium (2.73 mol/l) were dropped to the solution, and the mixture was stirred at room temperature overnight. After the solvent of the opaque solution had been removed by distillation under reduced pressure, the precipitate was washed with 20 ml of hexane. The washed product was dried under reduced pressure. As a result, a dilithium salt [Compound (4)] as a white powder was obtained.

34 ml of toluene were added to Compound (4). A suspension of 3.9 g (16.6 mmol) of zirconium tetrachloride in 51 ml of toluene was dropped to the above suspension at −20° C. After the mixture had been stirred at room temperature overnight, the solvent was removed by distillation under reduced pressure. As a result, a target product [Compound (5)] was obtained. Compound (5) was extracted with 30 ml of dichloromethane, and the filtrate was concentrated. The concentrated product was washed with 10 ml of hexane, and was then dried under reduced pressure. As a result, 500 mg of Compound (5) were obtained (in 7.4% yield). The determination of the $^1$H-NMR of the compound provided the following results.

$^1$H-NMR (500 MHz, CDCl$_3$) δ: 0.49 [6H, s, (CH$_3$)$_2$Si], 0.87 [6H, s, (CH$_3$)$_2$Si], 6.40 (2H, t, —CH—), 6.89 (4H, d, —CH—).

Examples in the case of an autoclave having a size of 1 l are described below.

Example 1

Under a nitrogen atmosphere, 3.4 ml of special grade toluene dehydrated so as to have a water content of 10 ppm or less, 0.2 mmol (2 mmol/ml toluene solution; 0.1 ml) of triisobutylaluminum, 10 μmol (10 μmol/ml toluene solution; 1 ml) of (1,1'-dimethylsilylene)(2,2'-dimethylsilylene)-bis(cyclopentadienyl)zirconium dichloride obtained in Production Example 1, 12 μmol (9.6 mg) of powdery N,N-dimethylanilinium tetrakis(pentafluorophenyl)borate, and 0.5 ml of 1-octene were loaded into a 50-ml Schlenk bottle made of glass, and the mixture was stirred at room temperature for 1 hour. After that, 60 μmol of methanol (MeOH) was added to the resultant and the mixture was stirred at room temperature for 1 hour to prepare a catalyst composition liquid A (Zr concentration: 2 mmol/l, total volume: 5 ml). Here, the term "a catalyst composition liquid" refers to a preparation liquid of catalyst materials.

An autoclave made of stainless steel having an internal volume of 1 l was sufficiently dried and air in the autoclave was replaced with nitrogen. After that, 1-dodecene and 1-octene each of which had been subjected to an activated alumina treatment (immersed in NKHO-24 manufactured by Sumitomo Chemical Co., Ltd. for 3 days) were loaded in amounts of 234 ml and 166 ml, respectively into the autoclave. Next, 0.04 mmol of triisobutylaluminum was loaded into the autoclave and a temperature in the autoclave was increased to 105° C. After 2 ml of the catalyst composition liquid A had been loaded into the autoclave, 0.02 MPaG of hydrogen was introduced into the autoclave and the mixture was subjected to a reaction at 105° C. for 120 minutes. The degree of conversion into a copolymer determined from the density of a liquid after the completion of the reaction was 85.8 mass %.

Example 2

A catalyst composition liquid B was prepared by the same procedure as that of Example 1 except that the kind of the alcohol was changed to isopropyl alcohol (IPA). The polymerization of the monomers was performed with the catalyst composition liquid B by the same procedure as that of Example 1. The degree of conversion into a copolymer was 88.0 mass %.

Example 3

A catalyst composition liquid C was prepared by the same procedure as that of Example 1 except that the kind of the alcohol was changed to t-butyl alcohol (tBuOH). The polymerization of the monomers was performed with the catalyst composition liquid C by the same procedure as that of Example 1. The degree of conversion into a copolymer was 89.6 mass %.

Example 4

A catalyst composition liquid D was prepared by the same procedure as that of Example 1 except that the kind of the alcohol was changed to 1-butyl alcohol (1-BuOH). The polymerization of the monomers was performed with the catalyst composition liquid D by the same procedure as that of Example 1. The degree of conversion into a copolymer was 80.1 mass %.

Example 5

A catalyst composition liquid E was prepared by the same procedure as that of Example 1 except that the kind of the alcohol was changed to methyl t-butyl ether (MTBE). The polymerization of the monomers was performed with the catalyst composition liquid E by the same procedure as that of Example 1. The degree of conversion into a copolymer was 89.1 mass %.

Comparative Example 1

A catalyst composition liquid F was prepared by the same procedure as that of Example 1 except that methanol was not added. The polymerization of the monomers was performed with the catalyst composition liquid F by the same procedure as that of Example 1. The degree of conversion into a copolymer was 42.8 mass %.

The catalyst preparation conditions, polymerization conditions, and degrees of conversion of Examples 1 to 5 and Comparative Example 1 are shown in Table 1. It is found that when alcohols or ether as the component (D) is added in addition to the components (A) to (C), a degree of conversion in the same catalyst amount and under the same reaction conditions increases, and hence the activity of a catalyst largely improves.

TABLE 1

|  |  |  | Example 1 | Example 2 | Example 3 | Example 4 | Example 5 | Comparative Example 1 |
|---|---|---|---|---|---|---|---|---|
| Catalyst preparation condition | (A) Zr | μmol | 10 | 10 | 10 | 10 | 10 | 10 |
|  | (B) Borate | μmol | 12 | 12 | 12 | 12 | 12 | 12 |
|  | (C) TIBA | μmol | 200 | 200 | 200 | 200 | 200 | 200 |
|  | Volume | ml | 5 | 5 | 5 | 5 | 5 | 5 |
|  | Kind of component (D) |  | MeOH | IPA | tBuOH | 1-BuOH | MTBE | non |
|  | Amount of component (D) | μmol | 60 | 60 | 60 | 60 | 60 | 0 |
|  | Ratio (D)/(A) | mol/mol | 6 | 6 | 6 | 6 | 6 | 0 |
|  | Ratio (D)/(C) | mol/mol | 0.3 | 0.3 | 0.3 | 0.3 | 0.3 | 0 |
| Polymerization condition, result | TIBA | μmol | 40 | 40 | 40 | 40 | 40 | 40 |
|  | Monomer amount | ml | 400 | 400 | 400 | 400 | 400 | 400 |
|  | Amount of Zr | μmol | 2 | 2 | 2 | 2 | 2 | 2 |
|  | Hydrogen | MPaG | 0.02 | 0.02 | 0.02 | 0.02 | 0.02 | 0.02 |
|  | Temperature | ° C. | 105 | 105 | 105 | 105 | 105 | 105 |
|  | Time | min | 120 | 120 | 120 | 120 | 120 | 120 |
|  | Degree of conversion | mass % | 85.8 | 88.0 | 89.6 | 80.1 | 89.1 | 42.8 |

Zr: (1,1'-Dimethylsilylene)(2,2'-dimethylsilylene)-bis(cyclopentadienyl)zirconium dichloride
Borate: N,N-Dimethylanilinium tetrakis(pentafluorophenyl)borate
TIBA: Triisobutylaluminum
MeOH: Methanol
IPA: Isopropyl alcohol
tBuOH: t-Butyl alcohol
1-BuOH: 1-Butyl alcohol
MTBE: Methyl t-butyl ether Examples in the case of increasing the reaction scale are described below.

Example 6

Under a nitrogen atmosphere, 166 ml of special grade toluene dehydrated so as to have a water content of 10 ppm or less, 8 mmol (2 mmol/ml toluene solution; 4 ml) of triisobutylaluminum, 400 μmol (40 μmol/ml toluene solution; 10 ml) of (1,1'-dimethylsilylene)(2,2'-dimethylsilylene)-bis(cyclopentadienyl)zirconium dichloride obtained in Production Example 1, 0.48 mmol (360 mg) of powdery N,N-dimethylanilinium tetrakis(pentafluorophenyl)borate, and 20 ml of 1-octene were loaded into a 500-ml Schlenk bottle made of glass, and the mixture was stirred at room temperature for 1 hour. After that, 2.4 mmol of isopropyl alcohol was added to the resultant and the mixture was stirred at room temperature for 1 hour to prepare a catalyst composition liquid G (Zr concentration: 2 mmol/l, total volume: 200 ml).

An autoclave made of stainless steel having an internal volume of 30 l was sufficiently dried and air in the autoclave was replaced with nitrogen. After that, 1-dodecene and 1-octene each of which had been subjected to an activated alumina treatment were loaded in amounts of 8.0 kg (10.5 l) and 5.4 kg (7.5 l), respectively into the autoclave. Next, 2.7 mmol of triisobutylaluminum was loaded into the autoclave and a temperature in the autoclave was increased to 95° C. 0.02 MPaG of hydrogen was introduced into the autoclave and the catalyst composition liquid G was continuously introduced into the autoclave with a plunger pump at a rate of 18 ml per hour. After the start of the introduction of the catalyst, the internal temperature was maintained at 102° C. and the mixture was subjected to a reaction for 5 hours. A small amount of a reaction liquid in the middle of the reaction was extracted and a degree of conversion was measured. The final degree of conversion into a copolymer was 92.9%.

About 300 ml of the reaction liquid was extracted, 200 ml of ion-exchanged water was added to the liquid, and the mixture was vigorously stirred. After the mixture had been left at rest, an organic layer was distilled under a reduced pressure of about $1.0 \times 10^{-4}$ MPa at 200° C. so that toluene, a remaining monomer, and the like were removed by distillation. Thus, a colorless and transparent liquid was obtained. Further, the liquid was subjected to thin-film distillation with a thin-film distillation apparatus (a molecular distillation apparatus MS-300 Special Model manufactured by Sibata Scientific Technology Ltd. and a high-vacuum exhausting apparatus DS-212Z) under a reduced pressure of $2 \times 10^{-5}$ MPa at 180° C. Thus, a polymer from which a low-molecular weight component having 24 or less carbon atoms had been removed was obtained.

Example 7

A catalyst composition liquid H was prepared by the same procedure as that of Example 6 except that the kind of the alcohol was changed to tertiary butyl alcohol. The polymerization of the monomers was performed with the catalyst composition liquid H by the same procedure as that of Example 6. The degree of conversion into a copolymer was 94.4 mass %. About 300 ml of the reaction liquid was extracted and the same distillation operations as those of Example 6 were performed. Thus, a polymer from which a low-molecular weight component had been removed was obtained.

Comparative Example 2

A catalyst composition liquid I was prepared by the same procedure as that of Example 6 except that isopropyl alcohol was not added. The polymerization of the monomers was performed with the catalyst composition liquid I by the same procedure as that of Example 6. The final degree of conversion into a copolymer was 79.4 mass %. About 300 ml of the reaction liquid was extracted and the same distillation operations as those of Example 6 were performed. Thus, a polymer from which a low-molecular weight component had been removed was obtained.

Example 8

The polymerization of the monomers was performed by the same procedure as that of Example 6 except that: the hydrogen introduction temperature and the polymerization reaction temperature were set to 86° C.; the catalyst introduction rate was set to 9 ml/hr; and the polymerization time was set to 7 hours. The degree of conversion into a copolymer was 90.8 mass %. About 300 ml of the reaction liquid was extracted and the same distillation operations as those of Example 6 were performed. Thus, a polymer from which a low-molecular weight component had been removed was obtained.

Comparative Example 3

The polymerization of the monomers was performed by the same procedure as that of Comparative Example 2 except that: the hydrogen introduction temperature and the polymerization reaction temperature were set to 86° C.; and the polymerization time was set to 7 hours. The final degree of conversion into a copolymer was 88.1 mass %. About 300 ml of the reaction liquid was extracted and the same distillation operations as those of Example 6 were performed. Thus, a polymer from which a low-molecular weight component had been removed was obtained.

The catalyst preparation conditions, polymerization conditions, and degrees of conversion of Examples 6 to 8 and Comparative Examples 2 and 3 are shown in Tables 2 and 3. It is found that when alcohols as the component (D) is added to the catalyst formed of components (A) to (C), a degree of conversion in the same catalyst amount and under the same reaction conditions increases, and hence the activity of a catalyst improves.

TABLE 2

| | | | Example 6 | Example 7 | Comparative Example 2 | Example 8 | Comparative Example 3 |
|---|---|---|---|---|---|---|---|
| Catalyst preparation condition | Volume | ml | 200 | 200 | 200 | 200 | 200 |
| | (A) Zr | μmol | 400 | 400 | 400 | 400 | 400 |
| | (B) Borate | μmol | 480 | 480 | 480 | 480 | 480 |
| | (C) TIBA | μmol | 8,000 | 8,000 | 8,000 | 8,000 | 8,000 |
| | Kind of component (D) | | IPA | tBuOH | non | tBuOH | non |
| | Amount of component (D) | μmol | 2,400 | 2,400 | 0 | 2,400 | 0 |
| | Ratio (D)/(A) | mol/mol | 6 | 6 | 0 | 6 | 0 |
| | Ratio (D)/(C) | mol/mol | 0.3 | 0.3 | 0 | 0.3 | 0 |
| Polymerization condition | TIBA | μmol | 2,700 | 2,700 | 2,700 | 2,700 | 2,700 |
| | Monomer amount | L | 18 | 18 | 18 | 18 | 18 |
| | Hydrogen | MPaG | 0.02 | 0.02 | 0.02 | 0.02 | 0.02 |
| | Temperature | ° C. | 102 | 102 | 102 | 86 | 86 |
| | Time | hr | 5 | 5 | 5 | 7 | 7 |

TABLE 3

| Amount of Zr μ mol | Degree of conversion data (mass %) | | | | |
|---|---|---|---|---|---|
| | Example 6 | Example 7 | Comparative Example 2 | Example 8 | Comparative Example 3 |
| 18 | — | — | — | 34.4 | — |
| 36 | 62.3 | — | 47.3 | 59.7 | 42.7 |
| 54 | — | — | 74.3 | — | — |
| 72 | 81.5 | 85.4 | 58.5 | 81.3 | 65.3 |
| 90 | — | — | — | 86.6 | — |
| 108 | 88.6 | 91.1 | 65.7 | 88.3 | 77.4 |
| 126 | — | — | — | 90.8 | — |
| 144 | 91.8 | 93.5 | 72.4 | — | 83.7 |
| 180 | 92.9 | 94.4 | 79.4 | — | 88.1 |

The results of the analysis of the polymers from which the low-molecular weight components had been removed by distillation obtained in Examples 6 to 8, and Comparative Examples 2 and 3 by the methods described in the sections (1) and (2) are shown in Table 4. It is found that both the polymer obtained by the production method of the present invention and the polymer obtained by the production method in which the component (D) is not used have such viscosity characteristics as to be useful as high-viscosity lubricating oil components.

TABLE 4

| | Kinematic viscosity at 40° C. mm²/s | Kinematic viscosity at 100° C. mm²/s | Viscosity index | Density at 15° C. g/cm³ | mm mol % |
|---|---|---|---|---|---|
| Example 6 | 452 | 53.1 | 183 | 0.847 | 32 |
| Example 7 | 428 | 50.6 | 182 | 0.846 | 31 |
| Comparative Example 3 | 587 | 66.5 | 189 | 0.848 | 31 |
| Example 8 | 1,501 | 151 | 215 | 0.851 | 32 |
| Comparative Example 3 | 1,579 | 158 | 216 | 0.851 | 33 |

Examples in the case of monomers that had not been subjected to an activated alumina treatment are described below.

Example 9

Under a nitrogen atmosphere, 334 ml of special grade toluene dehydrated so as to have a water content of 10 ppm or less, 40 ml of 1-octene, 24 mmol (2 mmol/ml toluene solution; 12 ml) of triisobutylaluminum, and 14.4 mmol of t-butyl alcohol were loaded into a 500-ml Schlenk bottle made of glass, and the mixture was stirred at room temperature for 1 hour. After that, 800 μmol (40 μmol/ml toluene solution; 20 ml) of (1,1'-dimethylsilylene)(2,2'-dimethylsilylene)-bis(cyclopentadienyl)zirconium dichloride obtained in Production Example 1 and 0.8 mmol (640 mg) of powdery N,N-dimethylanilinium tetrakis(pentafluorophenyl)borate was added to the resultant and the mixture was stirred at room temperature for 1 hour to prepare a catalyst composition liquid J (Zr concentration: 2 mmol/l, total volume: 400 ml).

An autoclave made of stainless steel having an internal volume of 30 l was sufficiently dried and air in the autoclave was replaced with nitrogen. After that, 1-dodecene and 1-octene each of which had not been subjected to an activated alumina treatment were loaded in amounts of 8.0 kg (10.5 l) and 5.4 kg (7.5 l), respectively into the autoclave. Next, 5.4 mmol of triisobutylaluminum was loaded into the autoclave and a temperature in the autoclave was increased to 95° C. 0.02 MPaG of hydrogen was introduced into the autoclave and the catalyst composition liquid J was continuously introduced into the autoclave with a plunger pump at a rate of 36 ml per hour. After the start of the introduction of the catalyst, the internal temperature was maintained at 102° C. and the mixture was subjected to a reaction for 5 hours. A small amount of a reaction liquid in the middle of the reaction was extracted and a degree of conversion was measured. Finally, the amount of the component (A) introduced was 504 µmol and the degree of conversion into a copolymer was 95.8 mass %.

About 300 ml of the reaction liquid was extracted, 200 ml of ion-exchanged water was added to the liquid, and the mixture was vigorously stirred. After the mixture had been left at rest, an organic layer was distilled under a reduced pressure of about $1.0 \times 10^{-4}$ MPa at 200° C. so that toluene, a remaining monomer, and the like were removed by distillation. Thus, a colorless and transparent liquid was obtained. Further, the liquid was subjected to thin-film distillation with a thin-film distillation apparatus (a molecular distillation apparatus MS-300 Special Model manufactured by Sibata Scientific Technology Ltd. and a high-vacuum exhausting apparatus DS-212Z) under a reduced pressure of $2 \times 10^{-5}$ MPa at 180° C. Thus, a polymer from which a low-molecular weight component having 24 or less carbon atoms had been removed was obtained.

Comparative Example 4

A catalyst composition liquid K was prepared by the same procedure as that of Example 9 except that t-butyl alcohol was not used. The polymerization of the monomers was performed with the catalyst composition liquid K by the same procedure as that of Example 9 except that: the catalyst introduction rate was set to 54 ml/hr; and the reaction time was set to 7 hours. Finally, the amount of the component (A) introduced was 756 µmol and the degree of conversion into a copolymer was 90.1 mass %. About 300 ml of the reaction liquid was extracted and the same distillation operations as those of Example 9 were performed. Thus, a polymer from which a low-molecular weight component had been removed was obtained.

Example 10

The polymerization of the monomers was performed by the same procedure as that of Example 9 except that: the hydrogen introduction temperature and the polymerization reaction temperature were set to 86° C.; and the reaction time was set to 5 hours. Finally, the amount of the component (A) introduced was 360 µmol and the degree of conversion into a copolymer was 95.2 mass %. About 300 ml of the reaction liquid was extracted and the same distillation operations as those of Example 9 were performed. Thus, a polymer from which a low-molecular weight component had been removed was obtained.

Comparative Example 5

The polymerization of the monomers was performed by the same procedure as that of Comparative Example 4 except that: the hydrogen introduction temperature and the polymerization reaction temperature were set to 86° C.; and the catalyst introduction rate was set to 36 ml/hr. Finally, the amount of the component (A) introduced was 432 µmol and the degree of conversion into a copolymer was 94.4 mass %. About 300 ml of the reaction liquid was extracted and the same distillation operations as those of Comparative Example 4 were performed. Thus, a polymer from which a low-molecular weight component had been removed was obtained.

The catalyst preparation conditions and polymerization conditions, and degrees of conversion of Examples 9 and 10 and Comparative Examples 4 and 5 are shown in Table 5 and Table 6, respectively. It is found that when t-butyl alcohol as the component (D) is added in addition to the components (A) to (C), a degree of conversion in the same catalyst amount and under the same reaction conditions increases, and hence the activity of a catalyst improves.

The results of the analysis of the polymers from which the low-molecular weight components had been removed by distillation obtained in Examples 9 and 10, and Comparative Examples 4 and 5 by the methods described in the sections (1) and (2) are shown in Table 7. It is found that both the polymer obtained by the production method of the present invention and the polymer obtained by the production method in which the component (D) is not used have such viscosity characteristics as to be useful as high-viscosity lubricating oil components.

TABLE 5

| | | | Example 9 | Comparative Example 4 | Example 10 | Comparative Example 5 |
|---|---|---|---|---|---|---|
| Catalyst preparation condition | Volume | ml | 400 | 400 | 400 | 400 |
| | (A) Zr | µmol | 800 | 800 | 800 | 800 |
| | (B) Borate | µmol | 800 | 800 | 800 | 800 |
| | (C) TIBA | µmol | 24,000 | 24,000 | 24,000 | 24,000 |
| | Kind of component (D) | | tBuOH | non | tBuOH | non |
| | Amount of component (D) | µmol | 14,400 | 14,400 | 14,400 | 14,400 |
| | Ratio (D)/(A) | mol/mol | 18 | 0 | 18 | 0 |
| | Ratio (D)/(C) | mol/mol | 0.6 | 0 | 0.6 | 0 |
| Polymerization condition | TIBA | µmol | 5,400 | 5,400 | 5,400 | 5,400 |
| | Amount of monomer | L | 18 | 18 | 18 | 18 |

TABLE 5-continued

|  |  | Example 9 | Comparative Example 4 | Example 10 | Comparative Example 5 |
|---|---|---|---|---|---|
| Hydrogen | MPaG | 0.02 | 0.02 | 0.02 | 0.02 |
| Temperature | ° C. | 102 | 102 | 86 | 86 |
| Time | hr | 5 | 7 | 5 | 7 |

TABLE 6

| Catalyst amount μ mol | Conversion rate data (mass %) | | | |
|---|---|---|---|---|
| | Example 9 | Comparative Example 4 | Example 10 | Comparative Example 5 |
| 72  | 34.2 | —    | 55.4 | 20.9 |
| 108 | —    | 31.7 | —    | —    |
| 144 | 79.6 | —    | 84.4 | 60.9 |
| 216 | 91.4 | 48.2 | 91.9 | 78.7 |
| 288 | 94.7 | —    | —    | 86.4 |
| 324 | —    | 60.2 | —    | —    |
| 360 | 95.8 | —    | 95.2 | 90.2 |
| 432 | —    | 70.4 | —    | 92.5 |
| 504 | —    | —    | —    | 94.4 |
| 540 | —    | 80.7 | —    | —    |
| 648 | —    | 86.8 | —    | —    |
| 756 | —    | 90.1 | —    | —    |

TABLE 7

| | Kinematic viscosity at 40° C. mm$^2$/s | Kinematic viscosity at 100° C. mm$^2$/s | Viscosity index — | Density at 15° C. g/cm$^3$ | mm mol % |
|---|---|---|---|---|---|
| Example 9 | 435 | 51 | 181 | 0.847 | 31 |
| Comparative Example 4 | 470 | 54 | 182 | 0.847 | 31 |
| Example 10 | 1,296 | 133 | 211 | 0.850 | 32 |
| Comparative Example 5 | 1,382 | 141 | 213 | 0.851 | 33 |

Example 11

The polymer from which the low-molecular weight component had been removed by distillation obtained in Example 9 was loaded into an autoclave made of stainless steel having an internal volume of 1 l, and a stabilizing nickel catalyst (SN750 manufactured by Sakai Chemical Industry Co., Ltd.) was added at a mass ratio of 1 mass % to the autoclave. After that, under 2 MPa of hydrogen, the mixture was subjected to a reaction at 130° C. for 6 hours. After the completion of the reaction, the temperature was cooled to around 80° C. and then the contents were taken out. The catalyst component was separated by filtration with a 2-μm filter at around 70° C. Thus, a colorless and transparent hydride was obtained.

Example 12

Hydrogenation was performed by the same procedure as that of Example 11 except that the polymer from which the low-molecular weight component had been removed by distillation obtained in Example 10 was used instead of the polymer from which the low-molecular weight component had been removed by distillation obtained in Example 9. Thus, a colorless and transparent hydride was obtained.

The results of the analysis of the hydrides obtained in Examples 11 and 12 by the methods described in the sections (1) to (5) are shown in Table 8. It is found that the polymer obtained by the production method of the present invention has such characteristics as to be useful as a high-viscosity lubricating oil component.

TABLE 8

| | Kinematic viscosity at 40° C. mm$^2$/s | Kinematic viscosity at 100° C. mm$^2$/s | Viscosity index — | Density at 15° C. g/cm$^3$ | mm mol % | Mn — | Mw — | Mw/Mn — | Pour point ° C. | Double bond amount mol % |
|---|---|---|---|---|---|---|---|---|---|---|
| Example 11 | 441 | 51 | 179 | 0.846 | 33 | 2,870 | 4,820 | 1.68 | −45 | 0 |
| Example 12 | 1,302 | 134 | 211 | 0.850 | 33 | 4,770 | 7,600 | 1.59 | −42.5 | 0 |

Next, examples in the case where the number of carbon atoms of an α-olefin to be polymerized is changed are described.

Example 13

The polymerization of a monomer was performed by the same procedure as that of Example 3 except that: the α-olefins to be polymerized with the catalyst composition liquid A were changed to 1-decene alone; and its addition amount was changed to 400 ml. The degree of conversion into a homopolymer was 89.3 mass %.

Example 14

The polymerization of a monomer was performed by the same procedure as that of Example 3 except that: the α-olefins to be polymerized with the catalyst composition liquid A were changed to 1-hexene and 1-decene; and their addition amount were changed to 159 ml and 241 ml, respectively (provided that the total addition amount of α-olefins is 400 ml). The degree of conversion into a homopolymer was 90.1 mass %.

Example 15

The polymerization of a monomer was performed by the same procedure as that of Example 3 except that: the α-olefins to be polymerized with the catalyst composition liquid A were changed to 1-decene and 1-dodecene; and their addition amount were changed to 184 ml and 216 ml, respectively (provided that the total addition amount of α-olefins is 400 ml). The degree of conversion into a homopolymer was 87.4 mass %.

Comparative Example 6

The polymerization of the monomer was performed by the same procedure as that of Example 13 except that t-BuOH was not used. The degree of conversion into a homopolymer was 38.6 mass %.

TABLE 9

|  |  |  | Example 13 | Example 14 | | Example 15 | | Comparative Example 6 |
|---|---|---|---|---|---|---|---|---|
| Catalyst preparation condition | (A) Zr | μmol | 10 | 10 | | 10 | | 10 |
| | (B) Borate | μmol | 12 | 12 | | 12 | | 12 |
| | (C) TIBA | μmol | 200 | 200 | | 200 | | 200 |
| | Volume | ml | 5 | 5 | | 5 | | 5 |
| | Kind of component (D) | | tBuOH | tBuOH | | tBuOH | | non |
| | Amount of component (D) | μmol | 60 | 60 | | 60 | | 0 |
| | Ratio (D)/(A) | mol/mol | 6 | 6 | | 6 | | 0 |
| | Ratio (D)/(C) | mol/mol | 0.3 | 0.3 | | 0.3 | | 0 |
| Polymerization condition, result | TIBA | μmol | 40 | 40 | | 40 | | 40 |
| | Kind of monomer | | 1-Decene | 1-Hexene | 1-Decene | 1-Decene | 1-Dodecene | 1-Decene |
| | Monomer amount | ml | 400 | 159 | 241 | 184 | 216 | 400 |
| | Total monomer amount | ml | 400 | 400 | | 400 | | 400 |
| | Amount of Zr | μmol | 2 | 2 | | 2 | | 2 |
| | Hydrogen | MPaG | 0.02 | 0.02 | | 0.02 | | 0.02 |
| | Temperature | °C. | 105 | 105 | | 105 | | 105 |
| | Time | min | 120 | 120 | | 120 | | 120 |
| | Degree of conversion | mass % | 89.3 | 90.1 | | 87.4 | | 38.6 |

INDUSTRIAL APPLICABILITY

The employment of the production method of the present invention enables the production of an α-olefin polymer useful as a high-viscosity lubricating base oil with a small amount of a catalyst and enables industrially easy production of the polymer, and hence can contribute to a reduction in fuel consumption, energy savings, and an increase in lifetime which a lubricating oil is required to achieve.

The invention claimed is:

1. A method for producing an α-olefin polymer, comprising:
polymerizing one or more α-olefins with a polymerization catalyst;
wherein:
each of the one or more α-olefins has 8 to 14 carbon atoms;
the polymerization catalyst comprises:
a metallocene compound;
an ionic compound capable of reacting with the metallocene compound to transform the metallocene compound into a cation;
an organometallic compound; and
one or more alcohols selected from the group consisting of methanol, isopropyl alcohol, t-butyl alcohol and 1-butyl alcohol;
the polymerization catalyst has a molar ratio of the metallocene compound to the one or more alcohols of from 1:6 to 1:18, and a molar ratio of the one or more alcohols to the organometallic compound of less than 1;
the metallocene compound is (1,1'-dimethylsilylene)(2,2'-dimethylsilylene)-bis(cyclopentadienyl)zirconium dichloride;
the ionic compound is N,N-dimethylanilinium tetrakis(pentafluorophenyl)borate; and
the organometallic compound is triisobutylaluminum.

2. The method according to claim 1, wherein the polymerization catalyst is prepared by:
mixing at least the metallocene compound and the organometallic compound to obtain a first mixture, and
mixing at least the first mixture and the one or more alcohols selected from the group consisting of methanol, isopropyl alcohol, t-butyl alcohol and 1-butyl alcohol.

3. The method according to claim 1, wherein the polymerization catalyst is prepared by:
mixing at least the organometallic compound and the one or more alcohols selected from the group consisting of methanol, isopropyl alcohol, t-butyl alcohol and 1-butyl alcohol to obtain a second mixture, and
mixing at least the second mixture and the metallocene compound.

4. A method for producing a hydrogenated α-olefin polymer, comprising:
producing an α-olefin polymer by the method according to claim 1; and
hydrogenating the α-olefin polymer.

5. The method according to claim 1, wherein the alcohol comprises methanol.

6. The method according to claim 1, wherein the alcohol comprises isopropyl alcohol.

7. The method according to claim 1, wherein the alcohol comprises t-butyl alcohol.

8. The method according to claim 1, wherein the alcohol comprises 1-butyl alcohol.

9. The method according to claim 1, wherein the α-olefin comprises at least one selected from the group consisting of 1-octene, 1-decene and 1-dodecene.

10. The method according to claim 1, wherein the α-olefin comprises 1-octene.

11. The method according to claim 1, wherein the α-olefin comprises 1-decene.

12. The method according to claim 1, wherein the α-olefin comprises 1-dodecene.

\* \* \* \* \*